(12) United States Patent
Odom

(10) Patent No.: US 7,036,087 B1
(45) Date of Patent: Apr. 25, 2006

(54) TOOLBAR MANIPULATIONS

(76) Inventor: Gary Odom, 15505 SW. Bulrush La., Tigard, OR (US) 97223

( * ) Notice: Subject to any disclaimer, the term of this patent is extended or adjusted under 35 U.S.C. 154(b) by 1039 days.

(21) Appl. No.: 09/707,194

(22) Filed: Nov. 6, 2000

(51) Int. Cl.
*G06F 13/00* (2006.01)

(52) U.S. Cl. ........................ 715/779; 715/810
(58) Field of Classification Search ........... 345/733, 345/744, 762, 765, 738, 746, 854, 853; 715/779, 715/810, 838, 840
See application file for complete search history.

(56) References Cited

U.S. PATENT DOCUMENTS

| | | | |
|---|---|---|---|
| 5,644,737 A * | 7/1997 | Tuniman et al. | ............ 345/810 |
| 5,644,739 A | 7/1997 | Moursund | |
| 6,057,836 A | 5/2000 | Kavalam et al. | |
| 6,057,844 A | 5/2000 | Strauss | |
| 6,072,486 A | 6/2000 | Sheldon et al. | |
| 6,085,184 A | 7/2000 | Bertrand et al. | |
| 6,133,915 A * | 10/2000 | Arcuri et al. | ............ 345/764 |
| 6,417,873 B1 * | 7/2002 | Fletcher et al. | ............ 345/853 |

OTHER PUBLICATIONS

IBM Technical Disclosure Bulletin vol. 36 No. 08; Aug. 1993.*
Microsoft Developer's Network Online: Toolbar Controls Introduction (http://msdn.microsoft.com/library/psdk/shellcc/commctls/ToolBar/ToolBar_Overview.htm); Nov. 6, 2000.
Microsoft Developer's Network Online: WD2000: How to Create Custom Toolbars and Toolbar Buttons (http://support.microsoft.com/support/kb/articles/Q191/1/78.ASP?LN=EN-US&SD=gn&FR=0) ; Oct. 30, 2000.

* cited by examiner

*Primary Examiner*—Cao (Kevin) Nguyen

(57) ABSTRACT

A group of toolbar tools may be configured by direct user manipulation. Groups of tools on a toolbar may be directly expanded or compressed by user manipulation to optimize toolbar configuration. These operations may be accomplished modelessly. Tools or groups of tools may be automatically rearranged based upon usage frequency to optimize toolbar configuration. A toolbar may be made to wrap around to avoid disappearance resultant from window resizing.

4 Claims, 5 Drawing Sheets

1W WRAPPED TOOLBARS

9S WRAP START INDICATOR

9E WRAP END INDICATOR

| FEATURE | MOUSE ACTION | KEY |
|---|---|---|
| JOIN TOOLBARS | DRAG TOOLBAR HANDLE ONTO END OF JOINING TOOLBAR | CTL |
| SEPARATE GROUPS | DRAG GROUP DIVIDER VERTICALLY | CTL |
| MOVE GROUP | DRAG GROUP | CTL & ALT |
| MANUALLY COMPRESS/EXPAND GROUP | DRAG GROUP DIVIDER HORIZONTALLY | |
| ONE-CLICK COMPRESS/EXPAND GROUP | CLICK GROUP DIVIDER (TOOLBAR HANDLE IF FIRST GROUP) | ALT |
| TOGGLE TOOLBAR WRAP | CLICK WRAP TOGGLE BUTTON | |
| MOVE, REMOVE TOOL | DRAG TOOL | ALT |
| COPY TOOL | DRAG TOOL | ESC |

FIGURE 9

TOOLBAR MANIPULATIONS

TECHNICAL FIELD

The invention relates to software for computer systems, more particularly toolbars used in applications.

BACKGROUND OF THE INVENTION

Toolbars have become a standard feature of computer software applications. Even menus have become ensconced in toolbars. The reason is that toolbars offer immediately visible, iconically symbolic, single-click access to commonly used features.

SUMMARY OF THE INVENTION

One aspect of the invention is direct manual modeless configuration of tools and groups of tools in a toolbar. Another aspect is wrapping a toolbar. Another aspect is automatic configuration of tools and groups of tools in a toolbar based upon tool usage frequency.

BRIEF DESCRIPTION OF THE DRAWINGS

FIG. 9 summarizes manual toolbar innovations.

DETAILED DESCRIPTION OF THE INVENTION

Figure 1:
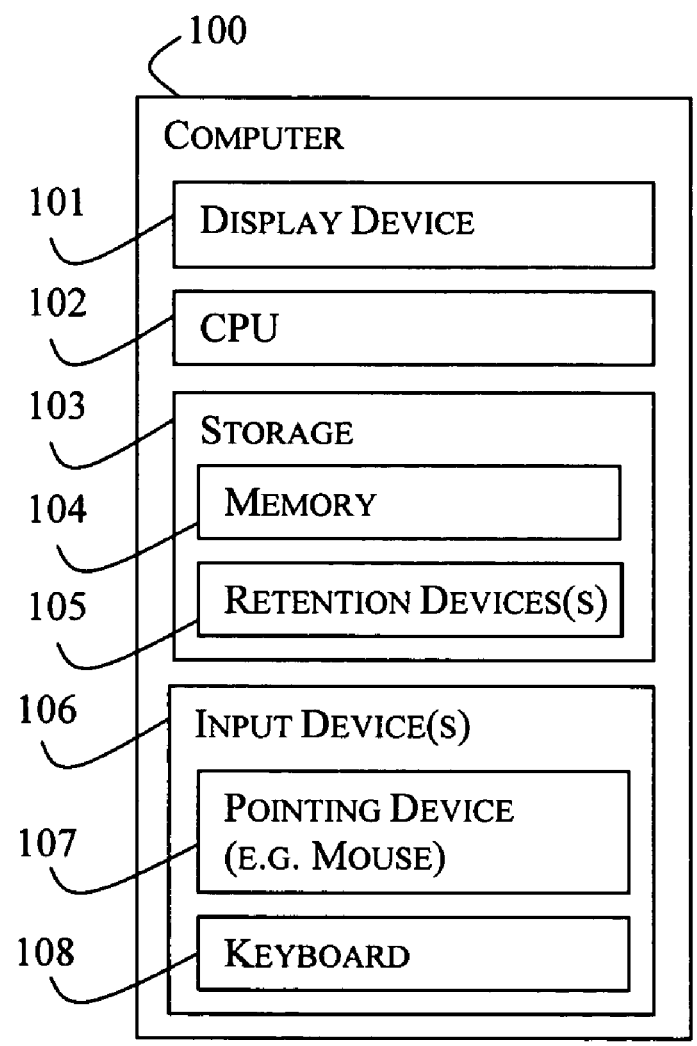
FIG. 1 is a block diagram of a computer suitable for practicing the invention.

FIG. 1 is a block diagram of a computer 100 which comprises at least a display device 101; CPU 102; storage 103, which comprises memory 104 and optionally one or more devices with retention medium(s) 105 such as hard disks, diskettes, compact disks, or tape; and one or more input devices 106, such a keyboard 108 and/or one or more pointing devices 107, such as a mouse. The mouse 107 is the most popular pointing device 107 for desktop computers 100. In the description below, the mention of mouse 107 is meant to include pointing devices 107 of any type. Such a computer 100 is suitable for use with this invention.

Figure 2:
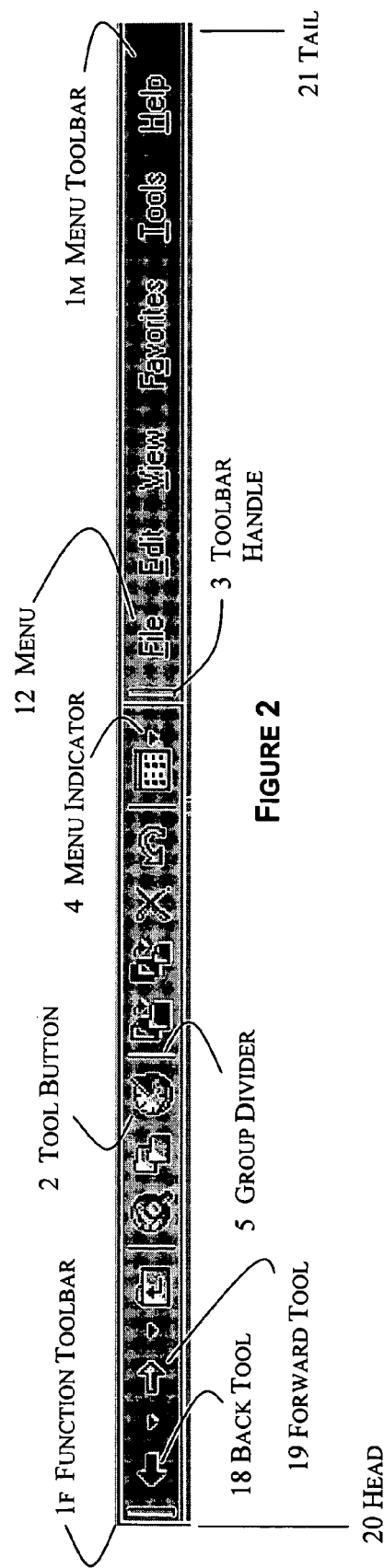
FIG. 2 depicts toolbars in the prior art.
Figure 3:
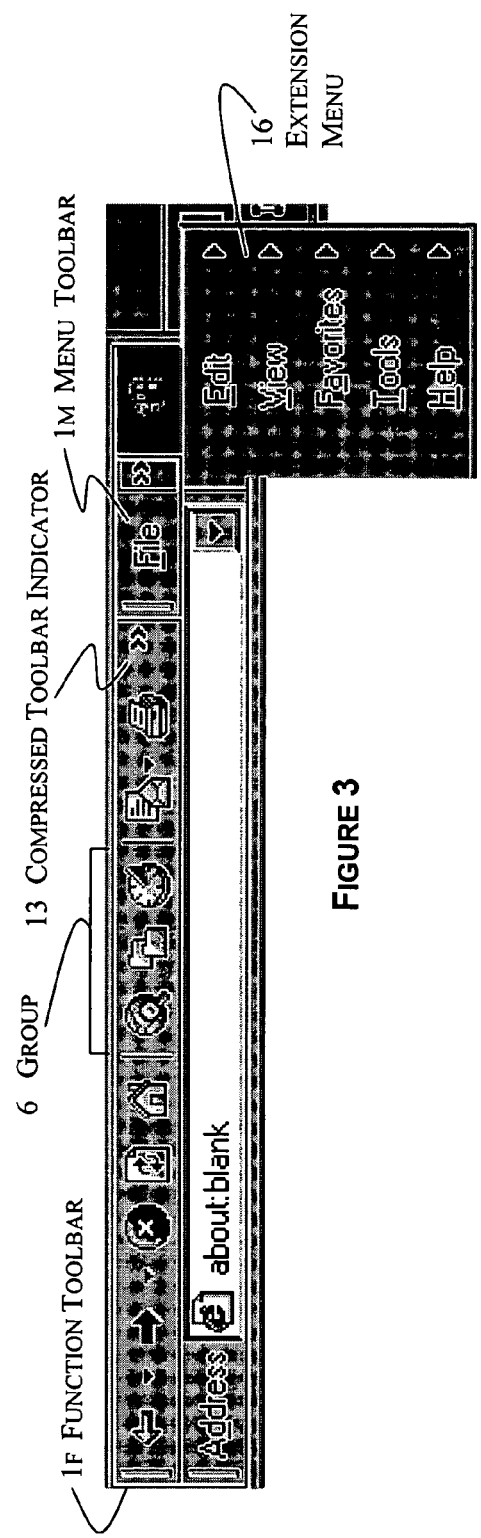
FIG. 3 depicts compressed toolbars in the prior art.

FIGS. 2 & 3 depicts toolbars in the prior art. Two toolbars 1 are depicted: a function toolbar 1f in front of a menu toolbar 1m, horizontally arranged end-to-end. A toolbar 1 comprises a set of tool buttons 2, typically represented as icons symbolic of functional features. A menu toolbar 1m comprises menus 12, as depicted. A toolbar 1 has a handle 3 by which the toolbar 1 may be moved.

Tools 2 are typically functionally segregated by group dividers 5. The set of tools 2 between group dividers 5, or between one end of a toolbar 1 and a group divider 5 is referred to as a group 6 of tools 2. For example, tools 2 derived from the 'File' menu 12 may be segregated by a group divider 5 from tools derived from the 'Edit' menu 12. In the prior art, users may customize tools 2 while in a customization mode, grouping and partitioning tools 2 without regard to their functional derivation. Also in the prior art, tools 2 may be added or removed via a menu 12 modelessly.

Toolbars 1 are depicted horizontally, but may have a vertical orientation as well. In the preferred embodiment, for horizontal orientation, the head 20 of a toolbar 1 is at the left, the end (tail) 21 at the right. For a horizontal toolbar 1, the length of a toolbar 1 or toolbar group 6 is the measurable distance from the head 20 of the toolbar 1 or group 6 to its tail 21. In the preferred embodiment, for vertical orientation, the head 20 of the toolbar 1 is at the top, the end (tail) 21 at the bottom. Tools 2 (with respect to a group 6) and groups 6 (with respect to a toolbar 1) also have a head 20 (horizontal: left or vertical: top) and tail 21 (horizontal: right or vertical: bottom) orientation corresponding to the toolbar 1.

Directly means by direct manual manipulation with the intended target, as opposed to indirectly, which would be a result caused by indirect action, such as indirectly changing the length of a toolbar 1 or toolbar group 6 by selecting a change in toolbar 1 icon size via selection of a menu or dialog item. Manual means via user interaction (as opposed to automatic, such a change based upon usage frequency). Other than adding or removing tools 2, tool 2 customization in the prior art occurs only within a customization mode. A mode is an exclusive mode of operation. In modal operation, a user is limited to operations specific to the particular mode. In tool 2 customization mode, for example, a user can only customize the toolbar 1; nominal application operations are inaccessible until the user quits the mode. In modeless operation, a user can act upon the nominal set of available operations. In graphic user interfaces, dialogs are commonly used to visibly indicate modality (though modeless dialogs also exist). Typically when a modal dialog is visible in the prior art, clicking the cursor outside the designated area of modality typically produces a warning sound, but does nothing else. In modes, operations specific to the mode (modal operations) must be completed before nominal application operations may proceed.

FIG. 3 depicts compressed toolbars 1. A toolbar 1 in the prior art is compressed if the window in which the toolbar 1 resides is narrowed to less than the length of one or more toolbars 1 arranged horizontally end-to-end. Compressed toolbars 1 may have a compressed toolbar indicator 13 that acts as an access mechanism for an extension menu 16 for access to tools 2 (or menus 12 for menu toolbars 1m) that are no longer immediately visible.

FIGS. 4 through 8 depict, and FIG. 9 summarizes, described toolbar 1 innovations and preferred embodiment methods, all of which are modeless. Other methods may be employed to equivalent result in alternate embodiments, including via menu item, function button, different selection or drag technique with or without specific keys pressed singularly or in combination, different key presses singularly or in combination, or other equivalent means.

Figure 4:
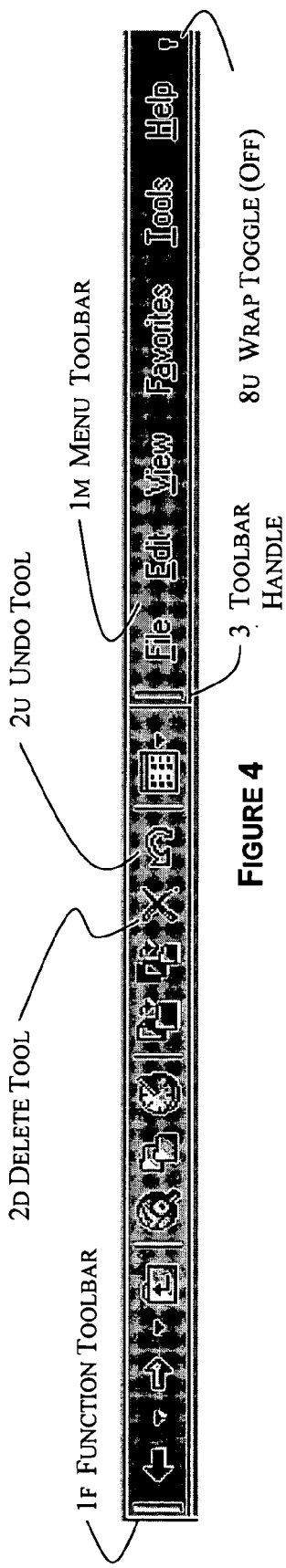
FIGS. 4 & 5 depict aspects of toolbar innovation.

FIG. 4 depicts two toolbars 1 arranged horizontally end-to-end. Depicted in FIG. 5, toolbars 1 may be merged (joined) 11: a tail-end 21 toolbar 1 (in the depicted example, the menu toolbar 1m) may be joined 11 to a head-end 20 toolbar 1 (in the depicted example, the function toolbar 1f). The preferred embodiment to merge 11 toolbars 1 is by selecting the tail-end 21 toolbar handle 3 (toolbar 1m in the Figure) while pressing the 'Ctl' key, then dragging the mouse 107 pointer onto the back end of the head-end toolbar (1f in the Figure), then releasing the mouse 107 button; not much movement, distance-wise. Upon completion of a merge operation in the preferred embodiment, the toolbar handle 3 becomes a group divider 5. To separate a group 6 and horizontally succeeding groups 6 (i.e., the rest of the toolbar 1) in the preferred embodiment, select the group 6 while pressing the 'Ctl' key, then drag the group divider 5 vertically; in other words, pull part of the toolbar 1 vertically off from the desired head 20 group 5.

Figure 5:
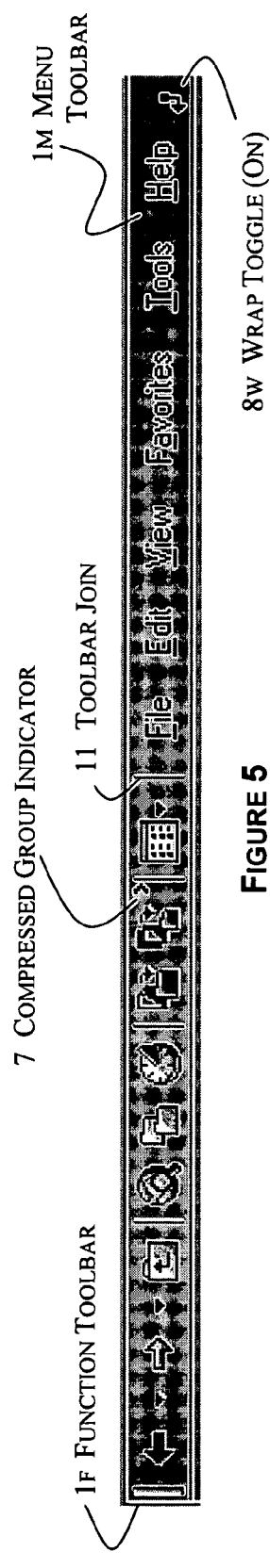

As depicted in FIGS. 4 & 5, groups 6 may be directly compressed and expanded in the preferred embodiment by sliding the tail 21 group divider 5 horizontally. As depicted, the delete tool 2*d* and undo tool 2*u* shown in FIG. 4 have been hidden in FIG. 5. A compressed group indicator 7 signals a compressed group 6 in the preferred embodiment. In the preferred embodiment, a collapsed group 6 may be expanded by one tool 2 by clicking the tail group divider 5 or compressed group indicator 7. In one embodiment, a group 6 may be collapsed by one tool 2 by clicking the tail group divider 5 or compressed group indicator 7 while pressing the 'Esc' key. In the preferred embodiment, a collapsed group 6 may be fully expanded by clicking the tail group divider 5 or compressed group indicator 7 while pressing the 'Alt' key. Likewise, clicking a tail-end 21 group divider 5 while holding the 'Alt' key in the preferred embodiment compresses a group 6 if the group 6 is fully expanded. In the preferred embodiment, if the group 6 had never been compressed by a user, the group 6 is compressed to display a single tool 2. If the group 6 has been compressed before, in the preferred embodiment the group 6 is compressed to the previously compressed number of tools 2. In other words, clicking a tail-end 21 group divider 5 while pressing the 'Alt' key in the preferred embodiment acts as a compression/expansion toggle.

Figure 6:
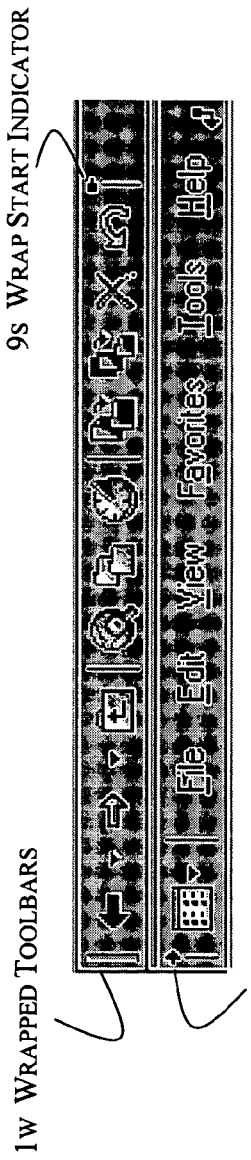
FIG. 6 depicts a wrapped toolbar.

A strip of one or more toolbars 1 may wrap-around when their enclosing window is narrowed such that the entire toolbar 1 strip is not visible. In the preferred embodiment, a wrap toggle button 8 at the end 21 of a toolbar 1 strip is clicked to enable 8*w* or disable 8*u* toolbar wrapping. FIG. 4 depicts the wrap toggle 8 off. FIG. 5 depicts the wrap toggle 8 on. FIG. 6 depicts a wrapped toolbar 1*w*. As depicted, in the preferred embodiment there are wrap indicators 9 to indicate wrapped toolbar 1*w* state.

Figure 7:
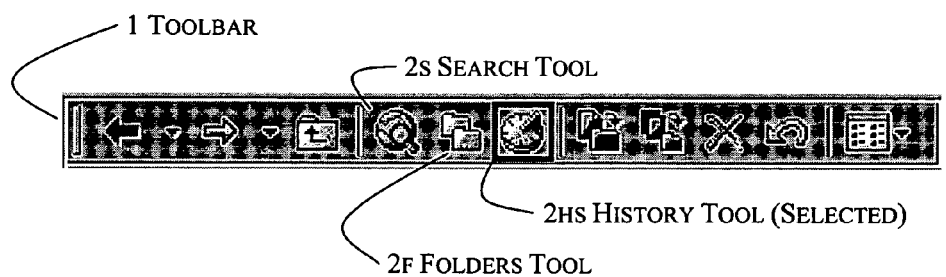
FIG. 7 depicts a selected tool in a toolbar.
Figure 8:
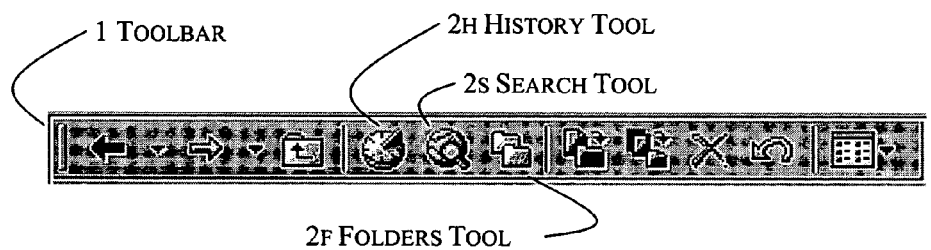
FIG. 8 depicts rearranged tools in a toolbar.

In the preferred embodiment, a tool 2 may be modelessly moved within a group 6 or toolbar 1, moved to another toolbar 1, or removed from a toolbar 1, by pressing the 'Alt' key, then selecting and dragging a tool 2: to move a tool 2, drag the tool 2 to its target location over a toolbar 1 and release the mouse 107 button; to remove a tool 2, drag the tool 2 outside of any toolbar 1 and release the mouse 107 button. In the preferred embodiment, a tool 2 may be modelessly copied within a group 6 or toolbar 1, copied to another toolbar 1, or copied to create a new toolbar 1, by pressing the 'Esc' key, then selecting and dragging a tool 2: to copy a tool 2, drag the tool 2 to its target location over a toolbar 1 and release the mouse 107 button; to create a new toolbar 1 from a tool 2, while retaining the tool 2 in its present position, drag the tool 2 outside of any toolbar 1 and release the mouse 107 button. FIG. 7 depicts an example of visual feedback to a user of a selected tool 2*hs*. FIG. 8 depicts the resultant rearrangement from of a tool 2 move by dropping the history tool 2*h* onto the toolbar 1 in front of the search tool 2*s*.

The technique of select, 'drag & drop', as it is commonly called, is known in the prior art, but has never been known to be applied to modeless configuration of toolbar 1 components. As in the prior art, ambiguous placement by sloppy dropping, such as dropping right on top rather than decidedly in front or behind, can be resolved to one pixel resolution fore or rear, and, if dropped dead center on top of a tool 2, a simple default rule to drop behind (the preferred embodiment) or in front of the existing tool 2 applied.

Similar to tool 2 rearrangement, in the preferred embodiment, a group 6 may be modelessly rearranged within a toolbar 1, moved to another toolbar 1, or taken off a toolbar 1 to become a separate toolbar 1 unto itself, by selecting the group 6 while pressing the 'Ctl' and 'Alt' keys, then dragging a group 6 to its target location and releasing the mouse 107 button. Note that in the preferred embodiment, a group 6 itself is selected, not group divider 5 nor toolbar handle 3; also note the unique key press combination in the preferred embodiment. If creating a new toolbar 1 from one or more tools 2 or groups 6, a user may be prompted to enter a new toolbar 1 name.

Optionally, tools 2 within a group 6 or integral (whole) groups 6 within a toolbar 1 may be automatically rearranged based upon usage frequency. A frequency (tool 2 usage) counter tracks each tool's 2 selection. Within a group 6, a frequently used tool 2 may be promoted toward the head 20 of a group 6 after a relative usage frequency threshold is achieved. The preferred embodiment of frequency threshold is to shift a tail-end tool 2 vis-à-vis its head-end 20 neighbor after a minimum of eight uses between the two tools 2 when the relative proportion of usage favors the tail-end 21 tool 2 by a relative two-to-one: so, a six (tail 21) to two (head 20) relative tool 2 use would cause a shift, as would a 7-3, but a 5-3 margin is less than two-to-one, so would not cause a shift. Similar methods may be employed in tracking relative aggregate usage of tools 2 in a group 6 to similarly rearrange groups 6 of a toolbar 1 based upon usage frequency.

In the preferred embodiment, tool 2 usage counters are not reset until necessary due to counter overflow. In alternate embodiments, tool 2 usage counters may be reset or otherwise adjusted after a shift.

Shifting tools 2 or groups 6 of toolbars 1 around automatically based upon usage frequency may seem spooky to users (due to its infrequency, a user may not remember setting such an option), so it is recommended that a confirmation prompt optionally appear each time a rearrangement is in the offing to inform and ask consent for the shift.

Optionally, some tools 2 or groups 6 may be exempt from rearrangement. For example, swapping the back 18 and forward 19 tools 2 might inherently be confusing, as the two have a culturally decided relational orientation as time vectors. Similarly, for example, groups 6 of toolbars 1 may have a certain logical order, such as correspondence to menu 12 order, whereby rearrangement may be undesirable. In the preferred embodiment, rearrangement exemption is a user option.

What is claimed is:

1. Software from at least one computer-readable medium automatically rearranging at least one tool based upon relative usage frequency of tools within a toolbar group.

2. Software according to claim 1 preventing at least one tool from being rearranged.

3. Software from at least one computer-readable medium automatically rearranging at least one group of a tools on a toolbar based upon aggregate usage frequency of tools within a tool group compared to another group.

4. Software according to claim 3 preventing at least one group from being rearranged.

* * * * *